United States Patent [19]

Stolarczyk et al.

[11] Patent Number: 4,879,755

[45] Date of Patent: Nov. 7, 1989

[54] MEDIUM FREQUENCY MINE COMMUNICATION SYSTEM

[75] Inventors: Larry G. Stolarczyk, Raton; Kurt A. Smoker, Las Cruces; Gerald J. Boese, Raton; William E. Mondt, Albuquerque; Marvin L. Hasenack, Jr., Raton, all of N. Mex.; James L. Zappanti, Trinidad, Colo.; Seth A. Smith; Edward D. Moore, both of Raton, N. Mex.

[73] Assignee: Stolar, Inc., Raton, N. Mex.

[21] Appl. No.: 56,559

[22] Filed: May 29, 1987

[51] Int. Cl.⁴ .......................................... H04B 13/02
[52] U.S. Cl. ........................................ 455/3; 455/40; 455/41; 455/100
[58] Field of Search ...................... 455/40, 14–16, 455/41, 3, 42, 55, 89, 68, 95, 100, 120, 121, 193; 340/347 R, 347 AD, 310 A, 310 R, 310 CP, 825.44; 367/81

[56] References Cited

U.S. PATENT DOCUMENTS

| | | | |
|---|---|---|---|
| 3,919,656 | 11/1975 | Sokal et al. | |
| 4,015,234 | 3/1977 | Kisbs | 455/40 |
| 4,087,781 | 5/1978 | Grossi et al. | 455/40 |
| 4,302,757 | 11/1981 | Still | 455/40 |
| 4,577,153 | 3/1986 | Stolarczyk | |
| 4,652,857 | 3/1987 | Meiksin | 455/40 |
| 4,777,652 | 10/1988 | Stolarczyk | 455/3 |

OTHER PUBLICATIONS

M. J. Sepich, "Intrinsically Safe Battery Pack", 1982, pp. 1–4.
H. Dobroski, L. Stolarczyk, "A Whole-Mine Medium-Frequency Radio Communication System", 7-28-82, pp. 133–135.
J. Hislop, W. Rundle, "Medium-Frequency Emergency Longwall Communication System", 7-30-86, pp. 23–25.
T. Nelson, B. Austin, G. Lambert, J. Odgers, "An Interim Report on an Underground Radio Communication System at Delmas Celliery", Feb. 2, 1979, pp. 2–6.
B. A. Bowles, "Telemetering and Telecontrol", Sept. 11, 1979, pp. G-4-G-8.

Primary Examiner—Robert L. Griffin
Assistant Examiner—Curtis Kuntz
Attorney, Agent, or Firm—Thomas E. Schatzel

[57] ABSTRACT

A method for using an underground mine communication system to effect minewide communication and an intrinsically safe current limiter circuit for insuring that electrical equipment in the system will not cause incendiary conditions. The underground mine communication system comprises a plurality of repeaters and medium frequency radios, including, mobile, portable and personal-carried radios, inductively coupled to electrical conductors and natural waveguides existing in the earth by tuned loop antennas. Messages transmitted by the radios are carried to the repeaters by the conductors or coal seam waves. The repeaters amplify, replicate and retransmit the message at two different frequencies for transmission of the message to a surface base station and to other radios in the system. A paging system, which has a separate set of repeaters, is also coupled to the network of electrical conductors and natural waveguides by tuned loop antennas. The paging system alerts miners to contact the surface base station. Radios, pagers and repeaters in the system are equipped with the intrinsically safe current limiter circuit to preclude the development of incendiary conditions. The current limiter circuit comprises a series arrangement of a current trip circuit, a redundant current trip circuit and a current limiting field effect transistor controlled by a feedback control amplifier.

24 Claims, 3 Drawing Sheets

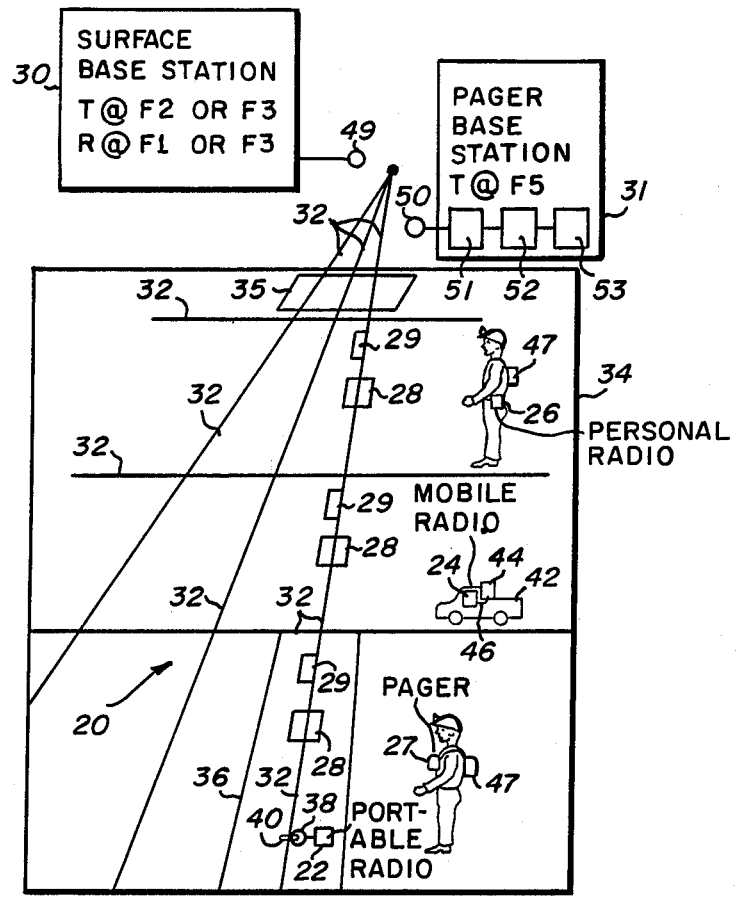
Fig_1
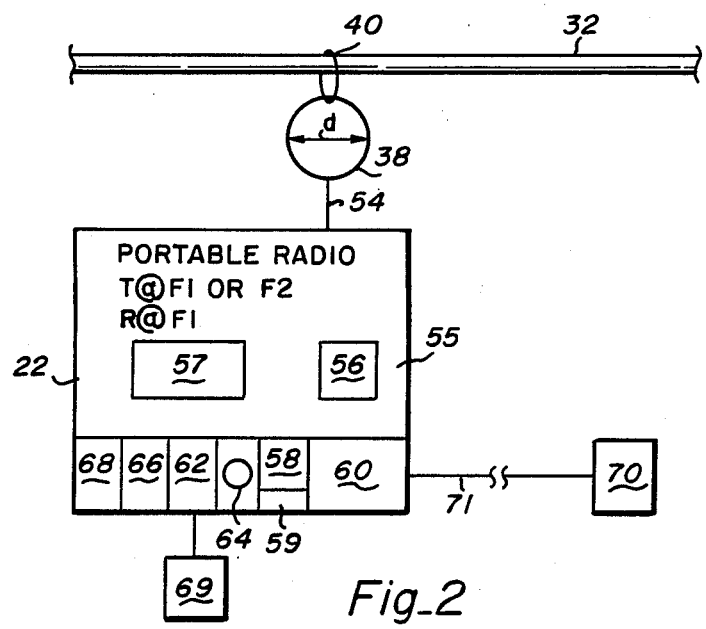
Fig_2

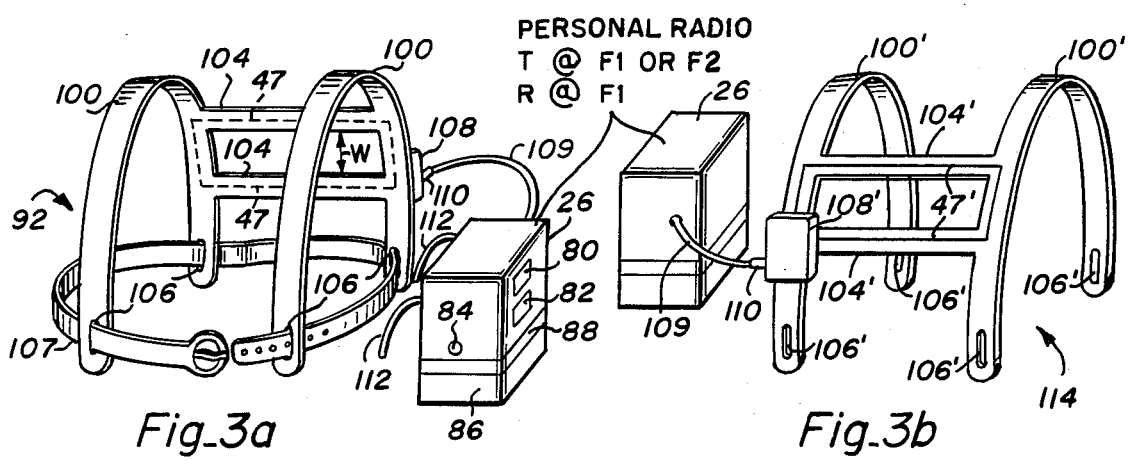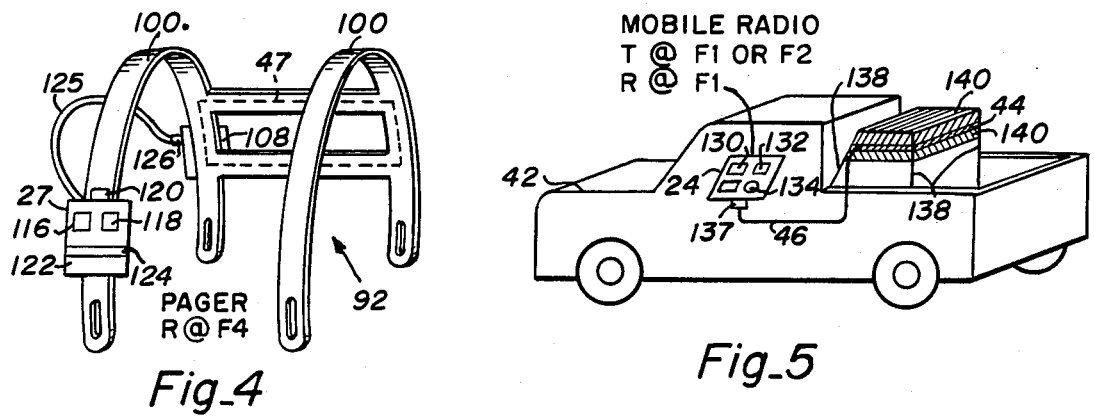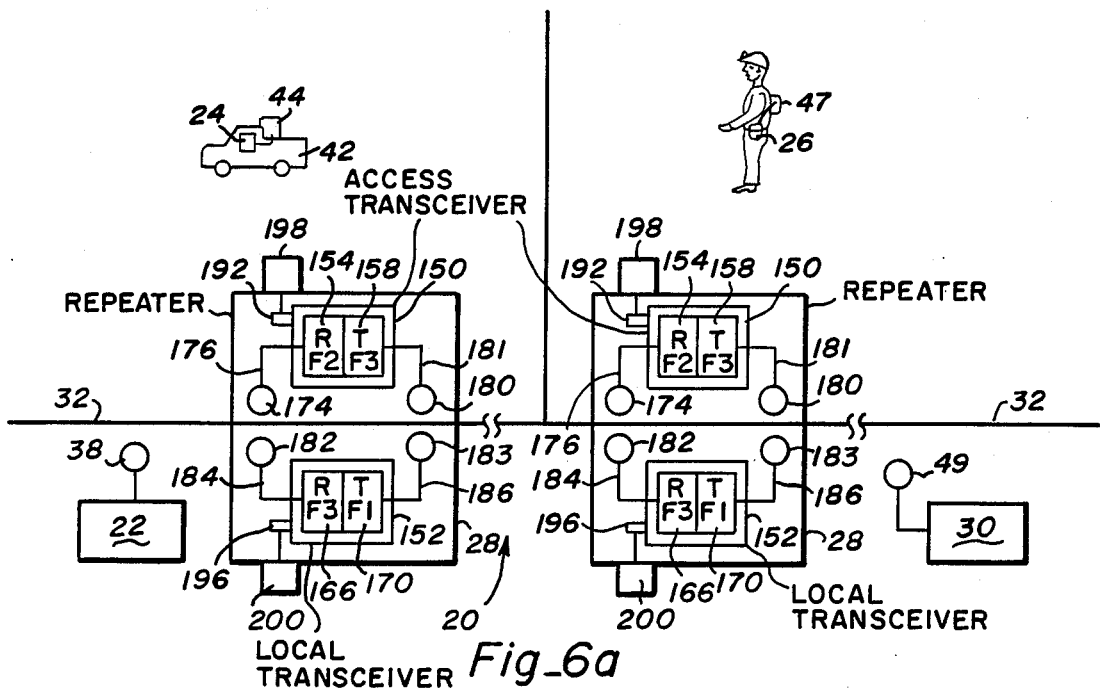

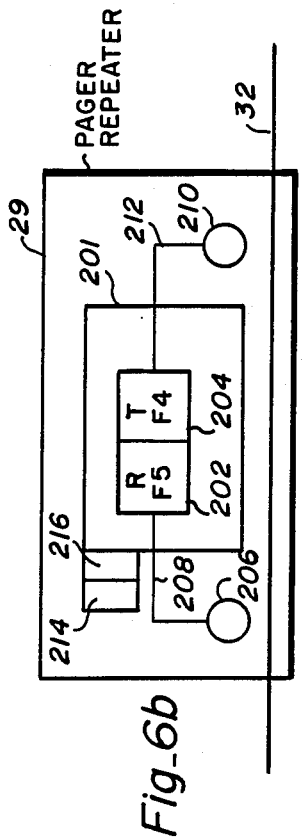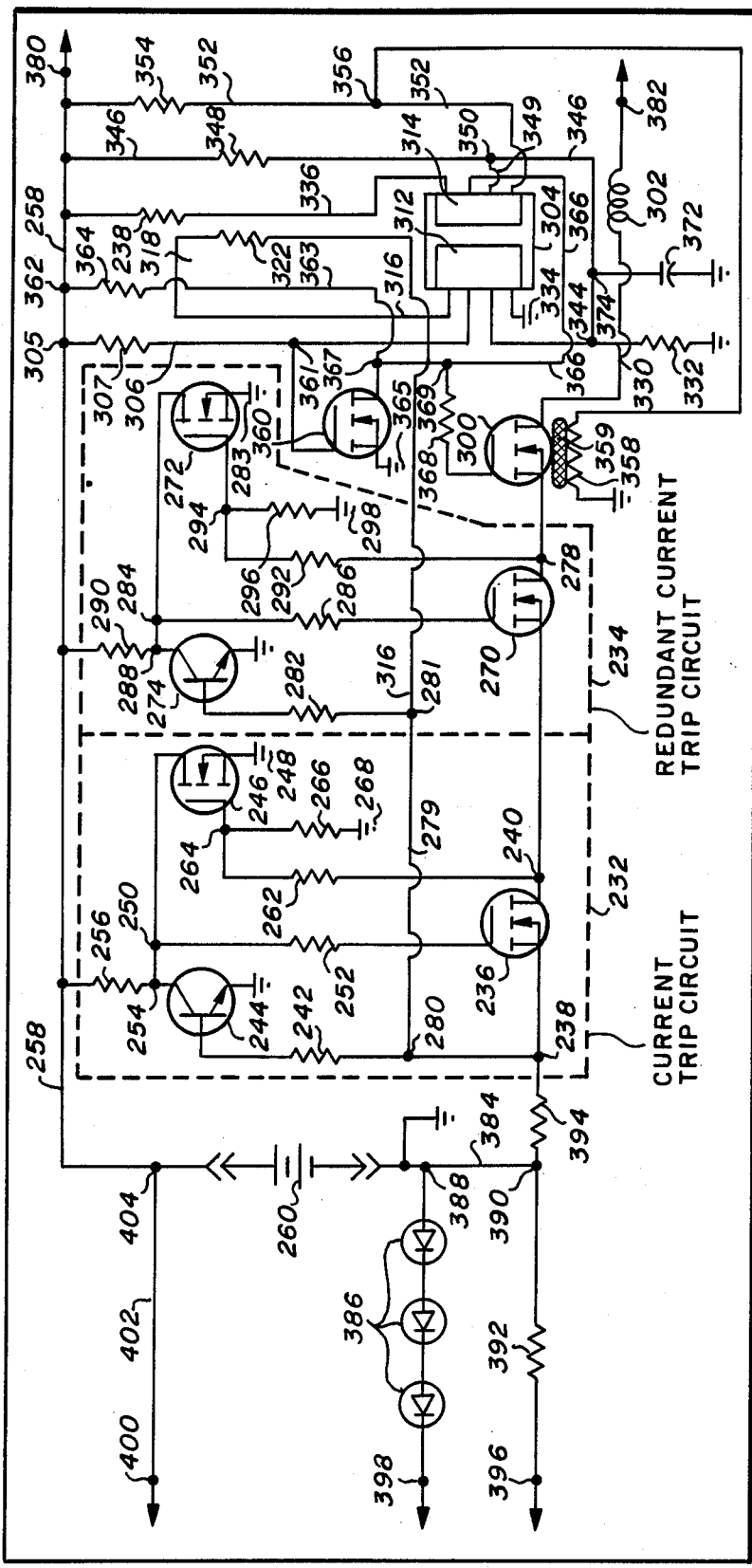

MEDIUM FREQUENCY MINE COMMUNICATION SYSTEM

BACKGROUND OF THE INVENTION

1. Field of the Invention

The present invention relates to a communication system for use in underground mines and more particularly to a mine communication system which includes a network of medium frequency transceivers and double-unit repeaters. The transceivers are magnetically coupled to electrical and natural waveguide conductors within the mine by loop antennas and are protected from incinerary conditions by an intrinsically safe current limiter circuit.

2. Description of the Prior Art

It has long been known that medium frequency (MF) electromagnetic waves propagate through natural media, such as coal and rock, as well as through electrical conductors such as track, wire rope and electrical wiring that exist in underground mines. Efforts have been made to exploit the propagation properties of MF signals to develop "wireless" communication systems. A wireless underground mine communication system would improve both mine productivity and mine safety. In a 1980 paper, Larry G. Stolarczyk proposed such a system. His cellular mine communication system exploited both the conductor mode of transmission and the natural waveguide mode of transmission for effecting MF radio communication within the mine. The system utilized a cellular repeater to provide a means for two mobile transceivers to communicate with each other. A communication link to the surface and to other repeaters was provided by a two-wire transmission line (i.e., a telephone line) over which voice signals in the audio frequency range were transmitted. L. Stolarczyk, *The Design of a Cellular MF Radio Communication System for Underground Mining*, Reprint from National Telecommunications Conference (Nov. 30–Dec. 4, 1980). Thus, this system suffered from the inability of surface stations and repeaters within the system to communicate with each other using radio frequency signals. This would become a serious problem if the telephone line was severed during a mine disaster, for example. This early system, which included a transceiver and a loop antenna attached to a vest worn by a miner, was described in more detail by L. Stolarczyk and R. Chufo in *System Design and Performance of an MF Radio Communication System for Underground Mining*, (Sept. 1981). The loop antennas used in these early systems were second order tuned loop antennas.

More recently, the MF wireless communication technique has been expanded to include a radio communication system which provides for the radio control of a mine train-loading operation. H. Dobroski and L. Stolarczyk, *Control and Monitoring via Medium-Frequency Techniques and Existing Mine Conductors*, IEEE Transactions on Industry Applications, Vol. 1A-21, No. 4 (July/August 1985). In this system, MF radio signals are induced on existing conductors through the use of air core line couplers.

Many attempts have also been made at using ferrite couplers to induce MF radio signals on conductors. These suffer from the problem that no single ferrite material functions satisfactorily as both a receiving and a transmitting line coupler.

Finally, surveys have been published which review the attempts at developing various types of loop antennas for use in wireless mine communication systems. R. Lagace, D. Curtis, J. Foulkes and J. Rothery, *Transmit Antennas for Portable VLF to MF Wireless Mine Communications*, USMB Contract Final Report (H0346045), Task C, Task Order No. 1 (Arthur D. Little, Inc.) May 1977.

Loop antennas for use in mine communication systems that have been incorporated into a bandolier type garment have long been known. See, e.g. B. A. Austin and G. P. Lambert, *An Interim Report on the Radio Communication System Installed Underground at Greenside Colliery, Apex Mines Limited*, Chamber of Mines of South Africa Research Report No. 39/77, Project No. CS1C10 (1977). The bandolier design suffers from the fact that as the miner's chest moves, the loop area of the antenna changes, thus changing the area and inductance of the antenna.

A separate direction in which mine communication methodology has developed is that of emergency communications. Two types of emergency mine communication systems are the seismic method and the borehole method. In the seismic method, a trapped miner transmits seismic vibrations by pounding on a rail or roof bolt. These signals are detected by surface geophones. After computer analysis of the arrival times of the seismic signals, the location of the trapped miner can be determined. The seismic method has proven inadequate because the deployment of geophone arrays is time consuming and voice communication is impossible. Additionally, the technique requires that the miner not be seriously injured so that he can pound on a rail or roof bolt in order to be detected.

In the borehole method, probes are lowered down boreholes in order to provide two-way voice communications with trapped miners. This method is not satisfactory because set-up drilling is time consuming and useless if the exact location of a trapped miner is not known.

A safety requirement for all electrical equipment used in mines is that the equipment be intrinsically safe. Intrinsically safe equipment is incapable of releasing sufficient electrical or thermal energy, under normal or abnormal conditions, to cause ignition of a specific hazardous atmosphere mixture in its most easily ignited concentration. *IEEE Standard Dictionary of Electrical and Electronics Terms*, 3rd Edition, p. 463 (1984). To satisfy this requirement, the Mine Safety and Health Administration (MSHA) and the U.K. Health and Safety Executive (HSE) require that batteries be protected with a fuse and series resistor circuit. The fuse is designed to blow out before the temperature of the resistor reaches a certain temperature. A disadvantage of this circuit is that it requires that larger batteries be used to compensate for the voltage drop across the resistor. The use of larger batteries increases the size of mine equipment and decreases the capacity of the batteries.

SUMMARY OF THE PRESENT INVENTION

It is therefore an object of the present invention to provide an underground mine communication system in which the plurality of repeaters and surface base stations can communicate with each other using medium frequency (MF) radio signals.

It is another object of the present invention to provide a method for communicating in an underground mine communication system whereby MF radio signals can be transmitted long distances to a surface base station.

It is another object of the present invention to provide an improved method for inductively coupling MF signals onto electrical conductors.

It is another object of the present invention to provide a method for inductively coupling MF signals onto natural waveguides.

It is another object of the present invention to provide an improved current limiter circuit which prevents incendiary conditions from developing in radios within the underground mine communication system.

It is another object of the present invention to provide a transmitter for use within the mine communication system that is optimized for maximum efficiency in generating a loop magnetic moment.

It is another object of the present invention to provide a portable radio for use within the communication system that can be carried by miners in emergency situations.

It is another object of the present invention to provide a personal carried radio for use within the communication system that can be used with a plurality of antennas.

It is another object of the present invention to provide a paging system for calling or warning miners.

It is another object of the present invention to provide a vertical loop antenna unit for use within the communication system that can be worn by a miner and in which the loop area will remain constant.

It is another object of the present invention to provide a mobile horizontal loop antenna for use within the communication system that can be mounted on a vehicle.

Briefly, the present invention includes a method for using an underground mine communication system to effect minewide communications and an intrinsically safe current limiter circuit for insuring that electrical equipment in the system will not cause incendiary conditions. The system includes portable radios, personal-carried radios, pagers, mobile radios and surface station radios all linked by a backbone network of repeaters. The repeaters are double transceivers tightly coupled to electrical conductors existing in the mine. The pagers have a separate repeater network. Messages transmitted by radios in the system are inductively coupled onto the electrical conductors at one frequency by vertical and horizontal loop antennas on the radios. The message is received by the repeaters which then amplify, replicate and transmit the message at two different frequencies. This allows the original radio message to be transmitted long distances to the surface stations as well as to other radios in the systems. The pagers include a signal light which is activated by a digitally encoded signal sent from a pager base station on the surface. This allows key personnel underground, to be contacted independently of the radio system. Each radio, pager and repeater in the system is equipped with an intrinsically safe (IS) current limiter circuit which insures that a fault in the system will not result in incendiary conditions. The IS current limiter circuit comprises a series arrangement of a current trip circuit, a redundant current trip circuit and a current limiting field effect transistor (FET). The current limiting FET is driven to a high resistance state by a feedback control amplifier whenever excessive current demand is drawn through the circuit. The current trip circuit then latches the system in an open position until the current draining fault is removed. A heat responsive thermistor attached to the current limiting FET supplements the feed back control amplifier. The transmitter unit of each radio and repeater in the system is designed for maximum efficiency in generating a loop magnetic moment. This is accomplished by optimizing the ratio of the power dissipated in the vertical loop antenna to the bandwidth of the frequency modulated MF carrier signal. In the present invention, thirty inch diameter loop antennas are used with the portable radios and repeaters. The personal-carried radio can be used with a plurality of loop antenna designs including a loop antenna which is incorporated into a suspenders/belt combination which can be worn by a miner. The mobile radio utilizes a horizontal loop antenna sandwiched between two boards and mounted on the outside of a mine vehicle.

An advantage of the present invention is that the repeaters can communicate with the base stations using MF radio signals.

Another advantage of the present invention is that MF radio signals can be transmitted over long distances from a radio located remotely to an electrical conductor to a surface base station.

Another advantage of the present invention is that vertical and horizontal loop antennas are used for inductively coupling MF radio signals onto electrical conductors.

Another advantage of the present invention is that the vertical loop antennas also inductively couple the MF radio signals onto natural waveguides.

Another advantage of the present invention is that an improved current limiter circuit is used to prevent incinerary conditions from developing in radios within the mine communication system.

Another advantage of the present invention is that the radio transmitters are optimized for generating a loop magnetic moment.

Another advantage of the present invention is that it includes a portable radio that can be used during mining emergencies.

Another advantage of the present invention is that it includes a personal-carried radio that can be used with a plurality of tuned vertical loop antennas.

Another advantage of the present invention is that it includes a paging system for calling or warning miners.

Another advantage of the present invention is that it includes an improved tuned vertical loop antenna that can be worn by a miner and which maintains a constant loop area.

Another advantage of the present invention is that it includes a tuned horizontal loop antenna that can be mounted on the outside of a vehicle.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is an idealized view of a medium frequency mine communication system of the present invention;

FIG. 2 is a block diagram of a portable radio and vertical loop antenna of the communication system of FIG. 1;

FIG. 3a is a diagram of a suspender loop antenna and a personal-carried radio of the communication system of FIG. 1;

FIG. 3b shows an alternative embodiment of the suspender loop antenna of FIG. 3a;

FIG. 4 shows the pager of the communication system of FIG. 1;

FIG. 5 is a diagram of the mobile vehicular radio and mobile horizontal loop antenna of the communication system of FIG. 1;

FIG. 6a is a block diagram of a pair of repeaters of the present invention;

FIG. 6b is a block diagram of a pager repeater of the present invention;

FIG. 7a is a circuit diagram of a conventionally designed intrinsically safe battery protection circuit; and FIG. 7b is a circuit diagram of a current limiter circuit of the present invention.

DETAILED DESCRIPTION OF THE PREFERRED EMBODIMENT

Referring now to FIG. 1, there is shown a medium frequency mine communication system referred to by the general reference numeral 20. The communication system 20 comprises a portable radio 22, a mobile vehicular radio 24, a personal-carried radio 26, a pager 27, a plurality of repeaters 28, a plurality of pager repeaters 29, a surface base station 30 and a pager base station 31. It is understood that there may be more or fewer than one of any of the radios 22, 24 or 26 and of surface base station 30, pager base station 31 or pager 27.

A plurality of transmission line electrical conductors 32 exist within a mine 34. (The conductors 32 may be telephone cables, AC power cable, monitor cable, rails, steel pipelines, etc.) Magnetic coupling between the transmission line electrical conductors 32 in an entry way 35 enables radio signal current flow in one conductor to induce signal current flow in a nearby conductor. The portable radio 22 is installed at a working face 36 of the mine 34 directly below the transmission line electrical conductor 32. A portable radio vertical loop antenna 38 attached to radio 22 is held in close proximity to the electrical conductor 32 by a connector 40. The mobile vehicular radio 24 is mounted inside of a mine vehicle 42 and is connected to a vehicular horizontal tuned loop antenna 44, mounted on the outside of vehicle 42, via a cable 46. The personal-carried radio 26 is a compact, battery powered transceiver designed to be mounted on a miner's belt. A personal-carried vertical tuned loop antenna 47 worn by the miners, is connected to the radio 26. The pager 27 can also be carried by a miner and would also be connected to the personal-carried vertical tuned loop antenna 47. The plurality of repeaters 28 are transceiver units designed to receive two frequencies F2 and F3 and to transmit two frequencies F1 and F3. The repeaters 28 are located in close physical proximity to electrical conductor 32. The surface base station 30 includes a medium frequency transceiver capable of transmitting the frequencies F2 and F3 and receiving the frequencies F1 and F3. Base station 30 is located at the mine surface portal or at any other central dispatch or monitoring point. The surface base station 30 and the pager base station 31 are individually coupled to the plurality of transmission line electrical conductors 32 via a surface base station vertical loop antenna 49 and a pager vertical loop antenna 50 which are located in close physical proximity to conductors 32. The pager base station 31 includes a pager transmitter 51, a pager encoder 52 and a pager computer 53.

Referring now to FIG. 2, there is shown the portable radio 22 in more detail. The connector 40 is a Nylon tie wrap which encircles the conductor 32 and the portable radio tuned loop antenna 38 holding antenna 38 in close proximity to conductor 32. The antenna 38 is a vertical tuned loop antenna having a diameter "d" of about thirty inches, and is connected to the portable radio 22 through wire 54. The radio 22 comprises a medium frequency (300–800 Khz) transceiver 55, capable of receiving one frequency F1 at a receiver 56 and transmitting two frequencies F1 and F2 from a transmitter 57; a stand-by battery pack 58, protected by an intrinsically safe current limiter circuit 59; a charging and power regulation circuit 60; a speaker 62; a squelch control knob 64; a noise canceling microphone 66, a time-out circuit 68, and an external speaker 69. A remote power supply unit 70 with intrinsically safe output, is connected to radio 22 through a cable 71. Under normal conditions, the portable radio 22 is mounted on a wall and serves as a stationary radio in the mine-wide communications system. In emergencies, portable radio 22 can be disconnected from the power supply unit 70 and conductor 32 and removed from its wall mount for portable use.

FIG. 3a shows the personal-carried radio 26 and personal-carried vertical tuned loop antenna 47 in more detail. The radio 26 is a small, approximately 1⅞" thick × 4⅛" wide × 8" tall, medium frequency transceiver capable of transmitting two frequencies, F1 and F2, from a transmitter 80 and receiving one frequency, F1, at a receiver 82. The radio 26 contains a squelch control knob 84 and is powered by a battery pack 86 which is equipped with an intrinsically safe current limiter circuit 88. The personal-carried tuned loop antenna 47 is a vertical tuned loop antenna that can be worn by a miner. In the preferred embodiment, the antenna 47 is a wire loop incorporated as part of a suspender loop antenna designated by the general reference numeral 92. The suspender loop antenna 92 is a one-piece harness comprising a pair of flexible shoulder straps 100 which loop over a miner's shoulders like suspenders. A pair of cross-straps 104 run perpendicular to shoulder straps 100, on the back of suspender loop antenna 92 (i.e., the pair of cross-straps 104 would be situated on the miner's back). A space "w" exists between the two cross-straps 104. A plurality of slots 106, on the lower ends of the shoulder straps 100, provide a means for securing the suspender antenna 92 to a belt 107 worn around the miner's waist. The belt 107 could also be permanently attached to the suspender loop antenna 92. Alternatively, the slots 106 could be any other suitable means for securing the suspender antenna 92 to the belt 107 such as a plurality of buckles, snaps or buttons. The antenna 47 is attached to the outside surface of the rectangle formed by the cross straps 104 and shoulder straps 100. A loop antenna tuning box 108 is securely fastened to one of the shoulder straps 100. A series tuned circuit is located inside of tuning box 108. A connecting wire 109 connects radio 26 to the tuning box 108. An antenna plug 110 allows connecting wire 109 to be plugged into the tuning box 108. The antenna plug 110 also allows radio 26 to be connected to antennas of other designs. A pair of clips 112 attached to radio 26 provide a means for attaching radio 26 to an ordinary belt worn around a miners waist.

FIG. 3b shows an alternative embodiment of the suspender loop antenna 92 designated by the general reference numeral 114. Elements in suspender loop antenna 114 which are analogous to elements in suspenders loop antenna 92 are designated by the original number followed by a prime designation. In suspender loop antenna 114, a pair of cross straps 104' run perpendicular to shoulder straps 100' on the front face of the suspender loop antenna 114. A wire loop antenna 47' is attached to the outside surface of the rectangle formed the cross straps 104' and shoulder straps 100'. A loop antenna tuning box 108' is securely fastened to a front surface of one of the shoulder straps 100'. The personal-carried radio 26 is connected to the loop antenna tuning box 108' by the connecting wire 109 and the antenna plug 110 in the same manner as was described in FIG. 3a. Similarly, a plurality of slots 106' provide a means for securing suspender loop antenna 114 to a miner's belt as shown in FIG. 3a. The embodiment depicted as suspender loop antenna 114 is useful, for example, in mine rescue operations where rescue team members carry an oxygen tank on their backs. In that situation, the oxygen tank would detune the loop antenna if it were also located on the miner's back.

FIG. 4 shows the pager 27 attached to the suspender loop antenna 92 of FIG. 3a. The pager 27 is attached to a front surface of one of the shoulder straps 100 and comprises a receiver 116, capable of receiving the frequency F4, a decoder 118 and a signal light 120. The pager 27 is powered by a battery pack 122 which is protected by an intrinsically safe circuit 124. The pager 27 is connected to the loop antenna tuning box 108 by a connecting wire 125 and an antenna plug 126. The antenna plug 126 allows the pager 48 to be connected to antennas of other designs.

FIG. 5 shows the mobile vehicular radio 24 in more detail. Radio 24 is a medium frequency transceiver capable of receiving one frequency F1 at a receiver 130, and transmitting two frequencies, F1 and F2, from a transmitter 132. A squelch control knob 134 is located on the face of radio 24. The radio 24 is mounted inside the cab of vehicle 42. The cable 46 links an antenna connector 137 to the vehicular tuned loop antenna 44. The antenna 44 is a long piece of wire fashioned into a rectangle lying horizontal to the bed of vehicle 42. The antenna 44 encircles a plurality of steel rods 138 coming up from the bed of vehicle 42. A pair of plywood boards 140 lie above and below antenna 44.

FIG. 6a shows the plurality of repeaters 28 in more detail. Each repeater 28 includes an access medium frequency transceiver 150 and a local medium frequency transceiver 152. The access transceiver 150 is capable of receiving a signal at frequency F2 at a receiver 154, amplifying and replicating the F2 signal at the frequency F3 and transmitting the F3 signal from a transmitter 158. The local transceiver 152 is capable of receiving a signal at frequency F3 at a receiver 166, amplifying and replicating the F3 signal at the frequency F1 and transmitting the F1 signal from a transmitter 170. The receiver 154 is tightly coupled to conductor 32 by a repeater vertical tuned loop antenna 174 and an antenna cable 176 which links antenna 174 to receiver 154. The transmitter 158 is also tightly coupled to conductor 32 by a repeater vertical tuned loop antenna 180 and an antenna cable 181 which links antenna 180 to transmitter 158. Similarly, receiver 166 and transmitter 170 are tightly coupled to conductor 32 by a pair of repeater tuned loop antennas 182 and 183 respectively, and a pair of antenna cables 184 and 186, respectively. The access transceiver 150 and the local transceiver 152 are protected by a pair of intrinsically safe (IS) limiter circuits 192 and 196, respectively. A pair of sealed lead acid batteries 198 and 200 are connected to the IS circuits 192 and 196, respectively.

FIG. 6b shows one of the plurality of pager repeaters 29. Each repeater 29 includes a transceiver 201 which comprises a receiver 202, capable of receiving the frequency F5, and a transmitter 204, capable of transmitting the frequency F4. The receiver 202 is tightly coupled to the transmission line conductor 32 by a pager repeater vertical tuned loop antenna 206 and an antenna cable 208 which links antenna 206 to a receiver 202. The transmitter 204 is also tightly coupled to the transmission line conductor 32 by a pager repeater vertical tuned loop antenna 210 and an antenna cable 212 which links antenna 210 to transmitter 204. The transceiver 201 is powered by a sealed lead acid battery 214 which is protected by an intrinsically safe limiter circuit 216.

In the preferred embodiment of the present invention, the frequencies F1, F2 and F3 are chosen to be 400 Khz, 520 Khz and 300 Khz, respectively. The basis for this choice is the empirical observation that the optimal frequency for propagating signals in underground mine transmission line electrical conductors is 300 Khz. This is because the attenuation rate for electromagnetic signal propagating on the transmission line electrical conductors, decreases with frequency of propagation. At 300 Khz the attenuation rate is only 2 dB/1000 ft., whereas at 520 Khz, the attenuation rate is 4-5 dB/1000 ft. Additionally, for frequencies below 300 Khz the mine generated electrical noise increases by 6 dB for each "halving" of frequency. Thus, 300 Khz represents an optimal propagation frequency. In contrast to propagation efficiency on the transmission line electrical conductors, however, remote loop antenna to transmission line coupling improves with frequency. Thus, 520 Khz signals are more efficiently coupled between a remote antenna and a conductor than are 300 Khz signals.

The functioning of the mine communication system 20 shown in FIGS. 1 and 5 can now be explained. The portable radio 22, the mobile radio 24 and the personal-carried radio 26 all use their respective tuned loop antennas 38, 44 and 47, to magnetically induce signal current flow in nearby conductors 32. Because the antennas 38, 44 and 47 are often four to fifteen feet from conductors 32 (remote), they induce only weak signal currents in conductors 32. To increase the operating range of the system 20, the repeaters 28 are used to receive weak radio signals, amplify the signals and then reinduce stronger current flow in the conductors 32. For example, when communication from the mobile vehicular radio 24 is desired, a signal is transmitted at frequency F2. This frequency allows efficient coupling between vehicular loop antenna 44 and electrical conductor 32 even when they are not physically close to each other. When the F2 signal, propagating in conductor 32, encounters one of the repeaters 28, the F2 signal is picked off by loop antenna 174 and relayed to receiver 154. The F2 signal is amplified, replicated (i.e. changed to the frequency F3) and retransmitted by transmitter 158 at frequency F3. Because antenna 180 is tightly coupled to conductor 32, the F3 signal is efficiently coupled back onto conductor 32 and propagates to every repeater 28 in system 20 and to the base station 30. At every repeater 28, the F3 signal is received by the receiver 166 via loop antenna 182. The F3 signal is then amplified, replicated and retransmitted at frequency F1 from transmitter 170 through loop antenna 113 back onto conductor 32. Since every mobile vehicular radio 24, personal-carried radio 26 and portable radio 22 is always tuned to frequency F1, they receive the signal.

The radios 22, 24 and 26 can also communicate directly with one another, at short range, without the use of repeaters 28, by transmitting directly on frequency F1.

The base station 30 can communicate with radios 22, 24 and 26 by transmitting a message to the repeaters 28 on frequency F2. This message is then replicated by the repeaters 28 and transmitted to the radios 22, 24 and 26 on frequency F1. The base station 30 can also communicate through the repeaters 28 by transmitting on frequency F3 and receiving signals at F1.

The pager 27 functions by alerting the person wearing the pager to contact the surface. The pager computer 53, contained within pager base station 31, can be programmed to initiate calls, periodically, until the person wearing the pager is reached. The computer 53 would initiate the call by generating a digital code, from the pager encoder 52, which would be modulated in a frequency shift key (FSK) format. The digitally coded call would then be transmitted by the pager transmitter 51 at the frequency F5. The call is transmitted from the pager loop antenna 50 onto the transmission line electrical conductors 32 and to th pager repeaters 29. When the F5 signal, propagating in a conductor 32, encounters one of the repeaters 29, the F5 signal is picked off by loop antenna 206 and relayed to receiver 202. The F5 signal is amplified, replicated and retransmitted by transmitter 204 at frequency F4. Because antenna 210 is tightly coupled to conductor 32, the F4 signal is coupled back onto conductor 32. When a person wearing pager 27 and suspender loop antenna 92 comes close to a conductor 32, the F4 signal is received by receiver 116, decoded by decoder 118 and used to activate the signal light 120. This alerts the pager wearer to contact the surface. Once the pager wearer has contacted the surface, the pager computer 53 is instructed to cease sending calls. In the preferred embodiment, the frequencies F4 and F5 are chosen to be 450 Khz and 250 Khz, respectively.

The use of tuned loop antennas (such as antennas 38, 44, 47, 174, 180, 182, 183, 49 and 50 in the present invention) is important to the functioning of system 20 for three reasons. First, loop antennas are very effective electromagnetic couplers in both the transmitting and receiving modes. In the transmit mode, loop antennas produce high current flow in nearby conductors and loop antennas do not change inductance (saturate) when transmitting. Additionally, loop antennas have the capability of being either tightly electromagnetically coupled to a conductor (i.e. being coupled in close physical proximity to the conductor) or of being remotely electromagnetically coupled to a conductor (i.e. achieving coupling to a conductor even when the loop antenna is 1-20 feet away from the conductor). Second, loop antennas have the ability to couple both transmission line electrical conductors and natural waveguides. Natural waveguides are formed when a layer of less conductive material (such as coal, troma or potash) is bounded above and below by more conductive rock. It is well known that the electrical field component of an electromagnetic wave is vertically polarized while the magnetic field component is horizontally polarized. Thus, in the mine 34, the loop antenna 38, hanging in a vertical plane below conductor 32, can efficiently electromagnetically couple the electrical conductor 32 and is also correctly positioned to receive the magnetic component of electromagnetic waves traveling in the natural waveguide mode in working face 36.

The importance of the natural waveguide coupling mode is that it enables communication links to be established through more than 1000 feet of solid coal and 300 feet of rock where no electrical conductors exist. Because of the ability of loop antennas to couple both electrical conductors and natural wave guide modes, the portable radio 22 would have the following operating ranges in a mine 34:

| Tight Coupling Operating Range (Conductor Mode) | |
| --- | --- |
| Type of Conductor | Range (feet) |
| Unshielded Wire Pair | 33,000 |
| Shielded Wire Pair | 20,000 |
| Remote Coupling Operation Range | |
| Mode | Distance (feet) |
| Conductor | 8,000 |
| Seam | 1,000 (radius) |

Finally, the third functional advantage of loop antennas is that they are easy to install and are much less expensive than other coupling devices such as ferrite or air core torroid couplers. In field testing, it has been determined that the loop antenna 38 in FIG. 1 can be suspended from conductor 32 using a connector 40 which can be simply a piece of Nylon string.

The design of the transmitters 57, 80, 132, 158, 170 and 204 in FIGS. 2-6 is also important to the functioning of the present invention. The transmitters 57, 80, 132, 158, 170 and 204 are designed to yield optimization of the magnetic moment of the transmitting loop antenna. The magnetic moment (M) is given by the equation:

$$M = NIA$$

where
N = the number of turns in the loop antenna;
A = the area of the loop antenna in square meters; and
I = the peak current in the loop.

Optimization of the transmitters is achieved by recognizing that for the transmitting loop antenna, $M = (P_o/BW)^{\frac{1}{2}}$ where $P_o$ = the power dissipated in the loop, and BW = the bandwidth of the FM carrier signal. So, in a series tuned circuit, $$Q = \omega L/R_L = P_o/BW$$

where
Q = qualify factor (loaded Q)
$\omega$ = radian frequency
L = inductance (henry)
$R_L$ = series resistance To maximize the magnetic moment, the loop bandwidth (BW) is made as small as possible while still being wide enough to accommodate the occupied bandwidth of the FM carrier signal. Thus, in the present invention, the ratio $P_o$/BW is seen as the electrical optimization parameter and not as just the maximum power to load resistance.

The receivers 56, 82 and 130 in FIGS. 2, 3 and 5 have been designed to include a means for measuring the received signal to noise (S/N) ratio. The squelch control knobs 64, 84 and 134 on the radios 22, 26 and 24 are calibrated so that each click of the squelch control knob indicates a change in the S/N ratio by 10 dB. This feature circumvents the necessity of having radio maintenance personnel carry field strength meters to determine the high voice quality communication range (fade margin).

The portable radio 22, shown in FIG. 2, serves two important functions in the mine communication system 20. First, under normal conditions, radio 22 functions as a stationary radio transceiver in system 20. A plurality of radios 22 would be placed in various locations in a mine 34 such as at the working face 36 and in saferooms, belt loading points and central control or communication points. The external speaker 69 provides a high volume audio capability so messages can be heard in the near vicinity of the unit.

Second, under emergency situations, such as a fire, explosion or cave-in, the portable radio 22 can be removed from its wall mount and carried by a miner enabling him to receive evacuation instructions and information.

Referring now to FIG. 7a, there is shown a conventionally designed intrinsically safe (IS) battery protection circuit 220. Circuit 220 includes a wirewound resistor 222 and a fuse 224 connected in series with a battery 226. A pair of contacts 228 and 229 provide a means for drawing current from circuit 220.

FIG. 7b shows an IS current limiter circuit 230 of the present invention. The circuit elements enclosed within the two dashed boxes of FIG. 6b form a current trip circuit 232 and a redundant current trip circuit 234. The circuit 232 includes a field effect transistor (FET) 236 connected in series between a node 238 and a node 240. A branch of node 238 contains a resistor 242, a transistor 244 and an FET 246 connected in series between node 238 and a ground 248 connected to the source terminal of FET 246. The emitter of transistor 244 is grounded. A node 250 is located between transistor 244 and FET 246. A resistor 252 is connected between node 50 and the gate terminal of FET 236. A node 254 is located between transistor 244 and node 250. A resistor 256 is connected between node 254 and a anode lead 258 which is connected to the anode of a twelve volt battery 260. A resistor 262 is connected between node 240 and the gate terminal of FET 246. A node 264 is located between resistor 262 and FET 246. A resistor 266 is connected between node 264 and a ground 268.

The redundant trip circuit 234 has an electrical structure identical to that of circuit 232 and includes a pair of FET's 270 and 272 and a transistor 274. The emitter of transistor 274 is grounded. The FET 270 is connected in series between the node 240 and a node 278. A lead 279 is connected between a node 280, which lies between resistor 242 and node 238, and a node 281. A branch of node 281 contains a resistor 282, the transistor 274 and the FET 272 connected in series between node 281 and a ground 283 connected to the source terminal of FET 272. A node 284 is located between transistor 274 and FET 272. A resistor 286 is connected between node 284 and the gate terminal of FET 270. A node 288 is located between transistor 274 and node 284. A resistor 290 is connected between node 288 and the anode lead 258. A resistor 292 is connected between node 278 and the gate terminal of FET 272. A node 294 is located between resistor 292 and FET 272. A resistor 296 is connected between node 294 and a ground 298.

The area to the right of redundant trip circuit 234 in FIG. 7b includes a current limiting FET 300 connected in series between the node 278 and a wire-wound inductor 302. A feedback control operational amplifier 304 is connected to the anode lead 258 at a node 305 by an output lead 306. A resistor 307 is connected in series between the node 305 and amplifier 304. The amplifier 304 includes a current limit voltage comparator 312 and a case temperature limiter 314. An output lead 316 forms a rectangular loop 318 which is connected between comparator 312 and the node 281. The loop 318 includes a resistor 322 connected in series between node 281 and comparator 312. An input lead 330 of comparator 312 is connected to a grounded resistor 332. Another input lead 334 of amplifier 304 is grounded. An input lead 336 of the amplifier 304, which includes a resistor 338, is connected to the anode lead 258. A node 344 is located on input lead 330 between grounded resistor 332 and comparator 312. A lead 346, which includes a resistor 348, runs from node 344 to anode lead 258. An input lead 349 connects limiter 314 with lead 346 at a node 350. A lead 352, which includes a resistor 354, connects limiter 314 with anode lead 258. A node 356 is located on lead 352 between limiter 314 and resistor 354. A grounded heat responsive thermistor 358, located near the current limiting FET 300, is connected to lead 352 at node 356. A thermal connection 359 is made between thermistor 248 and FET 300 using thermally conductive epoxy. The gate terminal of an FET 360 is connected to the lead 306 at a node 361. The drain terminal of FET 360 is connected to the anode lead 258 at a node 362 by a lead 363. The lead 363 includes a resistor 364. A ground 365 is connected to the source terminal of FET 360. An output lead 366 is connected between the limiter 314 and a node 367 lying on lead 363. A resistor 368 is connected between the gate terminal of FET 300 and a node 369 lying on lead 366. A grounded capacitor 372 is connected to lead 346 at a node 374 lying between node 344 and node 350. An anode terminal 380 is located at the end of anode lead 258 furthest removed from battery 260. A cathode terminal 382 is located at the free end of inductor 302. The terminals 380 and 382 provide a means for connecting electronic equipment to the circuit 130.

The area to the left of current trip circuit 232 in FIG. 7b includes a cathode lead 384 which is connected to the cathode of battery 260. A plurality of battery charging diodes 386, connected in series, join cathode lead 384 at a node 388 near the cathode of battery 260. Cathode lead 384 branches at a node 390. One branch of cathode lead 384 is connected to a sense resistor 392. Along the other branch, a precision wirewound resistor 394 is connected between node 390 and node 238. A sense connector 396 is located at the free end of resistor 392. A cathode charge connector 398 is located at the free end of the series of diodes 386. An anode charge connector 400 is located on the free end of a lead 402 which connects to anode lead 258 at a node 404 near the anode of battery 260.

The functioning of the IS current limiter circuit 230 of the present invention can now be explained. The current limiter circuit 230 is designed to replace the conventional IS battery protection circuit 220 shown in FIG. 7a. The circuit 230 would be used with radios 22 and 24 and repeaters 28 of FIG. 1. For example, FIG. 2 shows the portable radio 22 equipped with a battery pack 58 and an intrinsically safe limiter circuit 59. The personal-carried radio 26 is equipped with a smaller IS limiter circuit 88 having the same design as circuit 230.

The circuits 59, 88, 192, 196, 216 and 214 are needed when using the radios 22 and 26 and repeaters 28 and 29 and the pager 27 in gaseous atmospheres, such as are found in coal mines, to prevent explosions. The current trip circuit 232, shown in FIG. 7b, emulates the fuse 224 of FIG. 7a. The feedback control operational amplifier 304 in FIG. 7b emulates the resistor 222 in FIG. 7a. The redundant trip circuit 234 of FIG. 7b serves as a back-up to current trip circuit 132. The operation of current limiter circuit 230 limits the instantaneous demand current flow to an intrinsically safe level.

The initial condition of the FET's 236, 270 and 300 is a low channel resistance condition of about 0.18 ohms. The current flow through resistor 394 produces a voltage V(1) by Ohm's Law. The current limit voltage comparator 312 has a reference voltage V(2), which is normally greater than voltage V(1), established by the biasing resistors 348 and 332. As long as the voltage V(1) remains less than voltage V(2), the channel resistance of FET 300 remains at the low value of about 0.18 ohms. However, in the event an excessive demand of current flow is caused by a fault in the equipment connected between terminals 380 and 382 or in the current limit voltage comparator 312, the voltage V(1) rises above voltage V(2). This drives the output lead 306 to a low level causing the channel resistance of FET 300 to increase and thus limiting the current flow through FET 300. Transistor 244 then turns on causing the FET 236 channel resistance to increase. Simultaneously, the FET 246 channel resistance goes to a low ohmic resistance state, for the purpose of latching FET 236 in its high resistance state, thereby permanently opening the demand current path. By opening terminals 380 and 382, the latch condition in circuit 230 can be removed. The redundant trip circuit 234 backs up the current trip circuit 232.

To further insure the fuse-like nature of circuit 230 and to prevent overheating of the FET 300, the heat responsive thermistor 358 is attached with thermally conductive epoxy to FET 300 at connection 359. If FET 300 heats up, the temperature increase is transferred to thermistor 358. Whenever the temperature of thermistor 358 exceeds a limit set by V(2), the gate of FET 300 is driven to a low state, thus increasing the channel resistance of FET 300. The function of case temperature limiter 314 is to prevent excess heat build-up in FET 300 which could cause incendiary conditions to develop.

When equipment is connected across the terminals 380 and 382, a transient demand current flows to charge capacitors in the equipment. This current is slowed down by the wire-wound inductor 302. The energy of this current transient is limited to less than 0.2 millijoules.

The plurality of diodes 386 and the charge connectors 388 and 400 provide a means for recharging battery 260. The sense resistor 392 and the sense connector 396 provide a means for determining the battery charging states. Initially, this is a high charge current rate followed by a flat charge rate.

The design of IS current limiter circuit 230 insures that a fault in any circuit (such as a short circuit) will not cause incinerary conditions to occur in the circuit. The entire circuit 230 is potted to prevent coal dust from accumulating on the component parts.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A method for communicating in mines which comprises:
   a. inductively coupling a first radio and a second radio to a transmission line electrical conductor that extends into a mine, the first radio and the second radio each including a receiver for receiving one frequency F1 and a transmitter for transmitting on at least one frequency F2 different from said frequency F1 with the frequencies F1 and F2 both lying in the medium frequency range;
   b. inductively coupling at least one access transceiver to said transmission line electrical conductor, the access transceiver having a receiver for said frequency F2 and a transmitter for transmitting a frequency F3 different from said frequencies F1 and F2;
   c. inductively coupling at least one local transceiver to said transmission line electrical conductor within said mine, the local transceiver having a receiver for receiving said frequency F3 and a transmitter for transmitting said frequency F1;
   d transmitting a first signal carrying information to be communicated from the first radio on the frequency F2;
   e. receiving said first signal at said access transceiver;
   f. retransmitting said first signal from said access transceiver on the frequency F3 as a second signal carrying said information to be communicated;
   g. receiving said second signal at at least one of said local transceivers;
   h. retransmitting said second signal from said local transceiver on the frequency F1 as a third signal carrying said information to be communicated; and
   i. receiving said third signal at said receiver of said second radio whereby said information to be communicated is conveyed from said first radio to said second radio.

2. A method for communicating in mines as recited in claim 1, further comprising:
   inductively coupling said first radio and said access transceiver to a seam of coal or rock whereby a natural waveguide mode of propagation for said first signal through the seam to the access transceiver is established.

3. A method for communicating in mines as recited in claim 1 wherein,
   the frequency F2 is approximately 520 Khz and the frequency F3 is approximately 300 Khz.

4. A method for communicating in mines as recited in claim 1 wherein,
   said second signal is received at a third radio tuned to the frequency F3 and inductively coupled to said transmission line electrical conductor.

5. A method for communicating in mines as recited in claim 1 wherein,
   the frequency F3 has a lower attenuation rate on said transmission line electrical conductor than the frequency F2.

6. A method for communicating in mines which comprises:
   a. using a first tuned loop antenna to inductively couple a first radio to a transmission line electrical conductor that extends into a mine and a second tuned loop antenna to inductively couple a second radio to said transmission line electrical conductor, the first radio and the second radio each including a receiver for receiving at least one frequency F1 and a transmitter for transmitting on at least one frequency F2 different from said frequency F1 with the frequencies F1 and F2 both lying in the medium frequency range;

b. using at least one access tuned loop antenna to inductively couple at least one access transceiver to said transmission line electrical conductor, the access transceiver having a receiver electrically connected to at least one of the access tuned loop antennas for receiving said frequency F2 from said transmission line electrical conductor and a transmitter electrically connected to at least one of the access tuned loop antennas for transmitting a frequency F3 different from said frequencies F1 and F2 on said transmission line electrical conductor;

c. using at least one local tuned loop antenna to inductively couple at least one local transceiver to said transmission line electrical conductor within said mine, the local transceiver having a receiver electrically connected to at least one of the local tuned loop antennas for receiving said frequency F3 from said transmission line electrical conductor and a transmitter electrically connected to at least one of the local tuned loop antennas for transmitting said frequency F1 on said transmission line electrical conductor;

d. transmitting a first signal carrying information to be communicated from the first radio on the frequency F2;

e. receiving said first signal at said access transceiver;

f. retransmitting said first signal from said access transceiver on the frequency F3 as a second signal carrying said information to be communicated;

g. receiving said second signal at at least one of said local transceivers;

h. retransmitting said second signal from said local transceiver on the frequency F1 as a third signal carrying said information to be communicated; and i. receiving said third signal at said receiver of said second radio whereby said information to be communicated is conveyed from said first radio to said second radio.

7. A method for communicating in mines as recited in claim 6, further comprising:
using the first tuned loop antenna and at least one of the access tuned loop antennas to inductively couple said first radio and said access transceiver to a seam of coal or rock whereby a neutral waveguide mode of propagation for said first signal through the seam to the access transceiver is established.

8. The method of claim 6 for communicating in mines wherein, the frequency F3 is approximately 300 Khz.

9. The method of claim 6 for communicating in mines wherein, the frequency F1 is approximately 400 Khz.

10. The method of claim 6 for communicating in mines wherein, the frequency of F2 is approximately 520 Khz.

11. The method of claim 6 for communicating in mines wherein, said transmitter of said first radio and said second radio can also transmit on said frequency F1.

12. The method of claim 6 for communicating in mines wherein,
said transmitter of said first radio can also transmit on said frequency F3.

13. The method of claim 6 for communicating in mines wherein,
said receiver of said first radio can also receive said frequency F3.

14. The method of claim 6 for communicating in mines wherein,
said first tuned loop antenna is a vertical tuned loop antenna physically attached to said electrical conductor by a connecting means for holding said first tuned loop antenna in close proximity to said electrical conductor.

15. The method of claim 6 for communicating in mines wherein,
said second tuned loop antenna is a vertical tuned loop antenna physically attached to said electrical conductor by a connecting means for holding said first loop antenna in close proximity to said electrical conductor.

16. The method of claim 6 for communicating in mines wherein,
said first tuned loop antenna is a horizontal tuned loop antenna mounted on a mobile vehicle.

17. The method of claim 6 for communicating in mines wherein,
said second tuned loop antenna is a horizontal tuned loop antenna mounted on a mobile vehicle.

18. The method of claim 6 for communicating in mines wherein,
said first tuned loop antenna is a vertical tuned loop antenna physically attached to a garment worn by a miner.

19. The method of claim 6 for communicating in mines wherein,
said second tuned loop antenna is a vertical tuned loop antenna physically attached to a garment worn by a miner.

20. The method of claim 12 for communicating in mines whreein, said first radio is located outside of said mine.

21. A method for alerting a person in a mine to contact a station which comprises:
a. using a tuned loop antenna to inductively couple a pager transmitter located at a station to a transmission line electrical conductor extending into a mine, said pager transmitter adapted to transmit a frequency F5;
b. inductively coupling at least one repeater to the transmission line electrical conductor within said mine by use of at least one tuned loop antenna, said repeater adapted for receiving the frequency F5 and transmitting a frequency F4;
c. inductively coupling a pager to the transmission line electrical conductor within said mine by use of a tuned loop antenna, said pager including a pager receiver for receiving the frequency F4;
d. transmitting a first signal at the frequency F5 from said pager transmitter to said repeater;
e. receiving the first signal at said repeater;
f. retransmitting the first signal from said repeater as a second signal at the frequency F4;
g. receiving the second signal at the pager receiver; and
h. using the second signal to activate an alarm means on the pager for notifying a person in said mine to contact said station.

22. The method for alerting a person in a mine to contact a station as recited in claim 21, further including the steps of:

a. digitally encoding said first signal prior to transmission from said pager transmitter; and b. decoding the second signal prior to activating the alarm means.

23. The method of claim 21 for alerting a person in a mine to contact a station wherein,
said frequency F4 is approximately equal to 450 Khz.

24. The method of claim 21 for alerting a person in a mine to contact a station wherein,
said frequency F5 is approximately equal to 250 Khz.

* * * * *